United States Patent
Esparza et al.

(10) Patent No.: US 9,672,081 B1
(45) Date of Patent: Jun. 6, 2017

(54) NATIVE SERVICE CONTROLLER (71) Applicant: Cylance Inc., Irvine, CA (US)

(72) Inventors: Alejandro Espinoza Esparza, Irvine, CA (US); Braden Russell, Ladera Ranch, CA (US); Haiming Pan, Irvine, CA (US); Ming Jin, Irvine, CA (US); Matthew Wolff, Newport Beach, CA (US); Ryan Permeh, Irvine, CA (US)

(73) Assignee: Cylance Inc., Irvine, CA (US)

( * ) Notice: Subject to any disclaimer, the term of this patent is extended or adjusted under 35 U.S.C. 154(b) by 0 days.

(21) Appl. No.: 15/236,328

(22) Filed: Aug. 12, 2016

(51) Int. Cl.
- *G06F 13/00* (2006.01)
- *G06F 9/54* (2006.01)
- *G06F 9/44* (2006.01)
- *G06F 21/62* (2013.01)

(52) U.S. Cl.
CPC ............... *G06F 9/541* (2013.01); *G06F 8/31* (2013.01); *G06F 21/6209* (2013.01)

(58) Field of Classification Search
CPC .............................. G06F 9/544; G06F 9/546
USPC ................................................ 719/312, 313
See application file for complete search history.

(56) References Cited

U.S. PATENT DOCUMENTS

| | | | | |
|---|---|---|---|---|
| 7,478,373 | B2 * | 1/2009 | Bond | G06F 9/45504 703/27 |
| 9,460,281 | B2 * | 10/2016 | Adams | G06F 21/54 |
| 2015/0193284 | A1 * | 7/2015 | Hamzata | G06F 9/546 719/313 |

* cited by examiner

*Primary Examiner* — Andy Ho
(74) *Attorney, Agent, or Firm* — Mintz Levin Cohn Ferris Glovsky and Popeo, P.C.

(57) ABSTRACT

In one respect, there is provided a system for loading managed applications. The system may include at least one processor and at least one memory. The memory may include program code which when executed by the at least one memory provides operations including: generating a single process, the generating comprising running a native code executable, the running of the native code execute loading a loader manager as part of the single process; loading, by the loader manager running within the single process, a runtime environment corresponding to a non-native code application; and loading, by the loader manager, the non-native code application, the non-native code application being loaded to run as part of the single process.

25 Claims, 7 Drawing Sheets

```
HRESULT hr = mpClrRuntimeHost-
>ExecuteInDefaultAppDomain(L"MyTe
stAssembly", L"MyTestClass", L"Hello",
L"", &dwRet);

if (FAILED(hr)) {
  // C# method invocation failed, handle
error.
}
```

← 224

```
// file:
MyTestAssembly.exe(.dll)

public static partial class
MyTestClass
{
  public static int
Hello(string arguments)
  {
    // add more
implementation here return 0;
  }
}
```

FIG. 2B

```
// Pinvoke to access Win32 APIs
[DllImport("kernel32.dll")]
public static extern IntPtr
GetModuleHandle(string
dllToLoad);
[DllImport("kernel32.dll")]
public static extern IntPtr
GetProcAddress(IntPtr hModule,
string procedureName);

// unmanaged function pointer
declaration to cache exported C+
+ API.
[UnmanagedFunctionPointer(Calli
ngConvention.Cdecl, CharSet =
CharSet.Unicode)]
private delegate int
SendNativeMessageDelegate(stri
ng message);

// member for caching the
retrieved exported C++ API.
static
SendNativeMessageDelegate
_SendNativeMessage = null;

// send message to native C++
application
public static int
SendNativeMessage(string
message)
{
  if (_SendNativeMessage == null)
  {
    // retrieve the C++ exported
API, and cache it.
    _SendNativeMessage =
(SendNativeMessageDelegate)M
arshal.GetDelegateForFunctionP
ointer(GetProcAddress(GetModul
eHandle(null),
"SendNativeMessage"),
typeof(SendNativeMessageDeleg
ate));
  }

// call to C++
  int ret =
_SendNativeMessage(message);

return ret;
}
```

NATIVE SERVICE CONTROLLER

TECHNICAL FIELD

The subject matter described herein relates generally to the deployment of applications and more specifically to a native service controller.

BACKGROUND

An application written in native code (e.g., C, C++) can be compiled directly into machine code and executed by a processor (e.g., an x86-class processor available from Intel Corporation of Santa Clara, Calif.). By contrast, executing an application written in non-native or managed code (e.g., C#, Java, Ruby, Python) can require a virtual environment (e.g., NET Runtime, Java Virtual Machine (JavaVM)) to provide a software emulation of a particular processor. Thus, an operation system may be required to load a particular runtime environment prior to loading a corresponding non-native code application.

For example, a runtime loader (e.g., NET runtime loader) can be invoked to load the runtime environment (Common Language Runtime (CLR), Mono Runtime) for non-native (e.g., .NET) applications. The runtime loader can define and publish a native programming interface (e.g., C# Hosting Interfaces in Windows, Java Native Interface for Java applications, and Mono Embedding API for Mono Runtime.), which can be used by native code to load a corresponding runtime environment. The runtime loader can be written in native programming language (e.g., C, C++) and compiled as a dynamic linked library that can be loaded directly by an operation system.

SUMMARY

Systems, methods, and articles of manufacture, including computer program products, are provided for loading managed applications. In some example embodiments, there is provided a system that includes at least one processor and at least one memory. The memory may include program code which when executed by the at least one memory provides operations including: generating a single process, the generating comprising running a native code executable, the running of the native code execute loading a loader manager as part of the single process; loading, by the loader manager running within the single process, a runtime environment corresponding to a non-native code application; and loading, by the loader manager, the non-native code application, the non-native code application being loaded to run as part of the single process.

In some variations, one or more features disclosed herein including the following features can optionally be included in any feasible combination. The operations can further include exchanging data between the non-native code application and another application loaded by the loader manager to run as part of the single process, the exchanging of data between the non-native code application and the other application being performed without using one or more inter process communication (IPC) mechanisms. The loader manager can be written in a native code programming language.

In some variations, the operations can further include loading, by the loader manager, another application, the other application being loaded to run as part of the single process. The other application can be another non-native code application, and the loader manager further can further load a runtime environment corresponding to the other non-native code application. Alternately, the other application can be a native code application. The runtime environment corresponding to the non-native code application can be a CLR environment, a Mono Runtime environment, a Ruby runtime environment, or a Python runtime environment. The non-native code application can be an application that requires the loading of the corresponding runtime environment prior to execution.

The loader manager can be written in a native code programming language. The loading of the at least one runtime environment can include loading a first non-native runtime environment corresponding to a first non-native code application, and loading a second non-native runtime environment corresponding to a second non-native code application. The first and/or second non-native runtime environment can comprise a CLR environment, a Mono Runtime environment, a Ruby runtime environment, or a Python runtime environment. The first and/or second non-native code application can comprise an application written in C#, Ruby, or Python.

In some variations, the system can further be configured to load, by the loader manager, at least one native code dynamic link library as part of the single process. The non-native code application and the native code dynamic link library can be configured to provide services adapted to operate in a background of a running operating system.

In some variations, the running of the native code executable can generate at least a first thread and a second thread. The first thread can be configured report a running status of the native code executable to a scheduler of an operating system. The second thread can configured to yield to the first thread by at least: determining, when the second thread is scheduled to run by the scheduler, whether the running status of the native code executable has been reported to the scheduler; in response to determining that the running status of the native code executable has not been reported to the scheduler, yielding to the first thread by at least transmitting, to the scheduler, a message that causes the scheduler to start running the first thread or a third thread. The yielding by the second thread allows the first thread to run ahead of the second thread and to report the running status to the scheduler before a loading of the native code executable is timed out.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

As noted above, loaders can be required to load different runtime environments for applications written in different non-native programming languages (e.g., C#, Java, Ruby, Python). Loading applications in this manner can generate a separate process for each different native code and non-native code application. The exchange of information between processes is typically conducted using a set of IPC mechanisms including, for example, sockets, pipes, and message queues. But exchanging sensitive information using one or more IPC mechanisms can require extra implementation efforts (e.g., information encryption). This can incur additional computing resources (e.g., processing time, memory) but does not thoroughly remove the risk of exposing sensitive information.

As such, in some implementations of the current subject matter, a native service controller can enable execution of multiple native code components that are implemented as a dynamic-link library, and non-native code applications and/or non-native code dynamic libraries in a single process. Native code applications (e.g., C, C++) are applications that can be run directly on a particular (e.g., x86 processor) while non-native code applications (e.g., C#, Java, Ruby, Python) are applications that can be run in a virtual environment that emulates a particular processor. Native and non-native code executed in a single process share the same virtual memory space, thereby obviating the need for using one or more IPC mechanisms. In this manner, native and non-native code can exchange information without incurring the additional computing resources associated with IPC mechanisms all while avoiding the risk of exposing sensitive information.

The native service controller can be an executable, which is a file that is capable of being executed or run as a program by a processor. The native service controller can be written in native code can thus be loaded by an operating system native program loader. In some implementations of the current subject matter, the native service controller can be a wrapper that encapsulates a plurality of applications including one or more non-native code applications. For example, the native service controller can include applications for the NET framework (e.g., developed by Microsoft Corporation of Redmond, Wash.) and/or applications written in Java (e.g., developed by Sun Microsystems of Santa Clara, Calif.), Ruby (e.g., developed by the Rails Core Team), and/or Python (e.g., developed by the Python Software Foundation of Delaware). According to implementations of the current subject matter, each of the plurality of native and/or non-native code applications can be adapted to provide one or more corresponding services (e.g., Windows services) adapted to operate in the background of a running operating system. Moreover, the native service controller can include a native-code application configured to load one or more non-native runtime environments including, for example, CLR, Mono, Java, Python, and Ruby. Subsequent to loading the appropriate non-native runtime environments, the native code application can be further configured to load the one or more non-native code applications encapsulated in the native service controller.

In some implementations of the current subject matter, loading the native service controller can trigger a plurality of threads, which are simultaneously running tasks. Specifically, loading the native service controller can generate a main or primary thread. The main thread is a thread that is configured to generate one or more worker threads. Moreover, the main thread or a worker thread can be configured to report, to a scheduler of the operation system or its proxy (e.g., Windows Service Control Manager (SCM in Windows)), the running status (e.g., SERVICE RUNNING) of the native service controller. Meanwhile, the worker threads can be configured to perform one or more other tasks required for initializing the native service controller.

According to some implementations of the current subject matter, the running status of the native service controller must be reported within a certain period of time (e.g., 30 seconds) in order to prevent the loading of the native service controller from timing out. However, the operating system scheduler may schedule the threads to run without prioritizing the thread that is responsible for reporting the running status of the native service controller. Thus, the threads that are not responsible for reporting the running status can be configured to yield (e.g., use of the central processing unit (CPU)) to the thread that is responsible for reporting the running status. These threads can be configured to yield until the running status of the native service controller has been reported to the operating system scheduler or its proxy. Yielding to the thread responsible for reporting the running status can allow that thread to run and report the running status of the native service controller within the required period of time (e.g., 30 seconds). Otherwise, a plurality of other threads can be scheduled (e.g., by the scheduler) to run ahead of the thread responsible for reporting the running status, thereby preventing that thread from reporting the running status of the native service controller before the loading of the native service controller is timed out.

Figure 1:
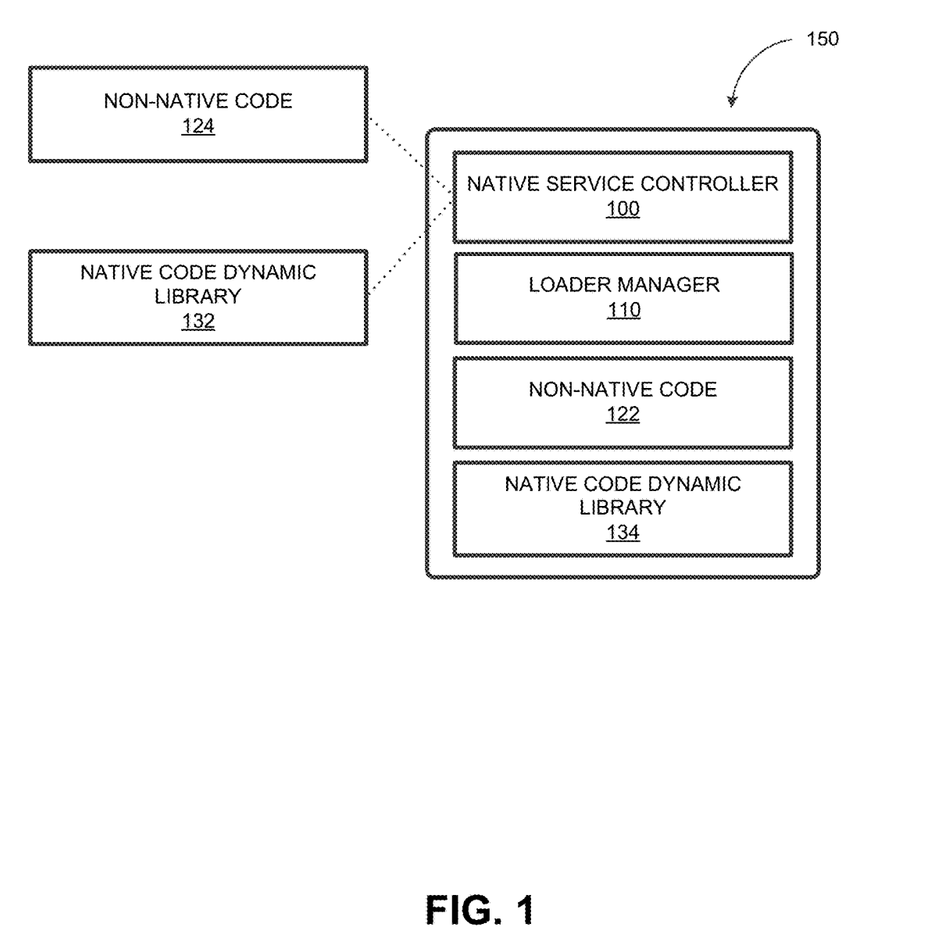
FIG. 1 depicts a block diagram illustrating a native service controller consistent with implementations of the current subject matter.

FIG. 1 depicts a block diagram illustrating a native service controller 100 consistent with implementations of the current subject matter. Referring to FIG. 1, the native service controller 100 can be an executable (e.g., native.exe) that is written in native code (e.g., C, C++). As shown in FIG. 1, the native service controller 100 can implement a loader manager 110, which is native code configured to load one or more non-native code virtual environments through corresponding native programming interfaces.

The native service controller 100 can further load, via the loader manager 110, one or more non-native code applications or dynamic libraries including, for example, a first non-native code 122 and a second non-native code 124. In addition, the native service controller 100 can also load, via the loader manager 110, one or more native code dynamic libraries including, for example, a first native code dynamic-link library 132 and a second native code dynamic-link library 134. It should be appreciated that the native service controller 100 can be configured to load a different number of non-native code applications and/or dynamic libraries and/or native code dynamic libraries without departing from the scope of the present disclosure.

As shown in FIG. 1, the native service controller 100 can be distributed (e.g., to one or more end users) in a distribution package 150 (e.g., software package) that includes the loader manager 110, the first non-native code 122, and the second native code dynamic-link library 134. As part of the distribution package 150, the loader manager 110 can be implemented as a dynamic-link library and/or a static link library. In some implementations of the current subject matter, the native service controller 100 can be configured to load, via the loader manager 110, native and/or non-native code applications and/or dynamic libraries that are packaged and distributed with the native service controller 100 (e.g., in the distribution package 150). Alternately or additionally, the native service controller 100 can be configured to load, via the loader manager 110, native code dynamic libraries and/or non-native code applications and/or dynamic libraries that are not included in the distribution package 150. For instance, the native service controller 100 can be configured to load, via the loader manager 110, the second native code 124 and the first native code dynamic-link library 132.

It should be appreciated that the native service controller 100 can be distributed without the loader manager 110 without departing from the scope of the present disclosure. In some implementations of the current subject matter, the loader manager 110 can be standalone executable that can be executed by an operating system and/or a native code application (e.g., to load one or more other native code applications). The loader manager 110 can also be implemented as a dynamic-link library that can be loaded by an operating system and/or a native code application (e.g., to load one or more other native code applications). Alternately or additionally, the loader manager 110 can be part of an operating system or be open source code that is built as part of a native code application.

Referring again to FIG. 1, the plurality of non-native code applications and/or dynamic libraries (e.g., the first non-native code 122, the second non-native code 124) can be written in different non-native programming languages and therefore require different runtime environments. For example, the first non-native code 122 can be a NET application that requires a CLR or Mono Runtime environment while the second non-native code 124 can be a Ruby application that requires a Ruby runtime environment. As such, the loader manager 110 can be configured to load the appropriate runtime environments for the non-native code applications and/or dynamic libraries (e.g., the first non-native code 122, the second non-native code 124).

In some implementations of the current subject matter, the loader manager 110 can be further configured to load one or more non-native code applications and/or dynamic link libraries subsequent to loading the corresponding runtime environment for each applications. Loading the native service controller 100 can generate a single process within the same virtual memory space.

According to implementations of the current subject matter, the plurality of native and/or non-native code applications included in the native service controller 100 are loaded (e.g., by the loader manager 110) as a part of the same process. As such, the native code dynamic libraries and/or the non-native code applications and/or dynamic libraries loaded by the native service controller 100 can share the same virtual memory space and are thus able to share data without using IPC. For example, the first non-native code 122 can communicate with one or more other applications (e.g., the second non-native code 124) by sending messages within the same process. Avoiding the use of IPC can prevent exposing sensitive data via the data exchange mechanisms (e.g., socket, pipe, message queue) that are typically associated with IPC.

In some implementations of the current subject matter, non-native code applications or non-native code dynamic-link libraries can be written in a non-native programming language (e.g., C#, Java, Ruby). To execute applications written in a non-native programming language, a native programming interface can be required in order for the operating system or its proxy to be able to load the corresponding virtual environments. The native programming interface can provide a means for exchanging data between native code and non-native code. As such, according to implementations of the current subject matter, the native service controller 100 can define and publish a single native programming interface that accepts, as an input parameter, a character string. The native programming interface can be used by both native and non-native code applications. The contents of character string can be transparent to the native service controller 100 and can be understood by only those applications engaged in the exchange of data. The contents of character string can be a command message and/or a data message. Alternately or additionally, the native service controller 100 can provide different pre-formatted character strings, which are understood by different group of participating applications.

In some implementations of the current subject matter, non-native programming language or its interface provides the means to share the same virtual memory space allocated to applications loaded in the same process. For instance, C# Marshal Class and number of native programming interfaces (e.g., GetShortArrayRegion) defined in Java Native Interface (JNI) can be used to share memory between native code and C# and Java. Thus, the native service controller 100 can allocate a chunk of memory and share this chunk of memory with the other native code in the dynamic-link library and/or non-native code applications that were loaded in the same process. The contents of such shared memory can be produced by one participating native code or non-native code and be consumed by other participating native code or non-native code.

Figure 2A:
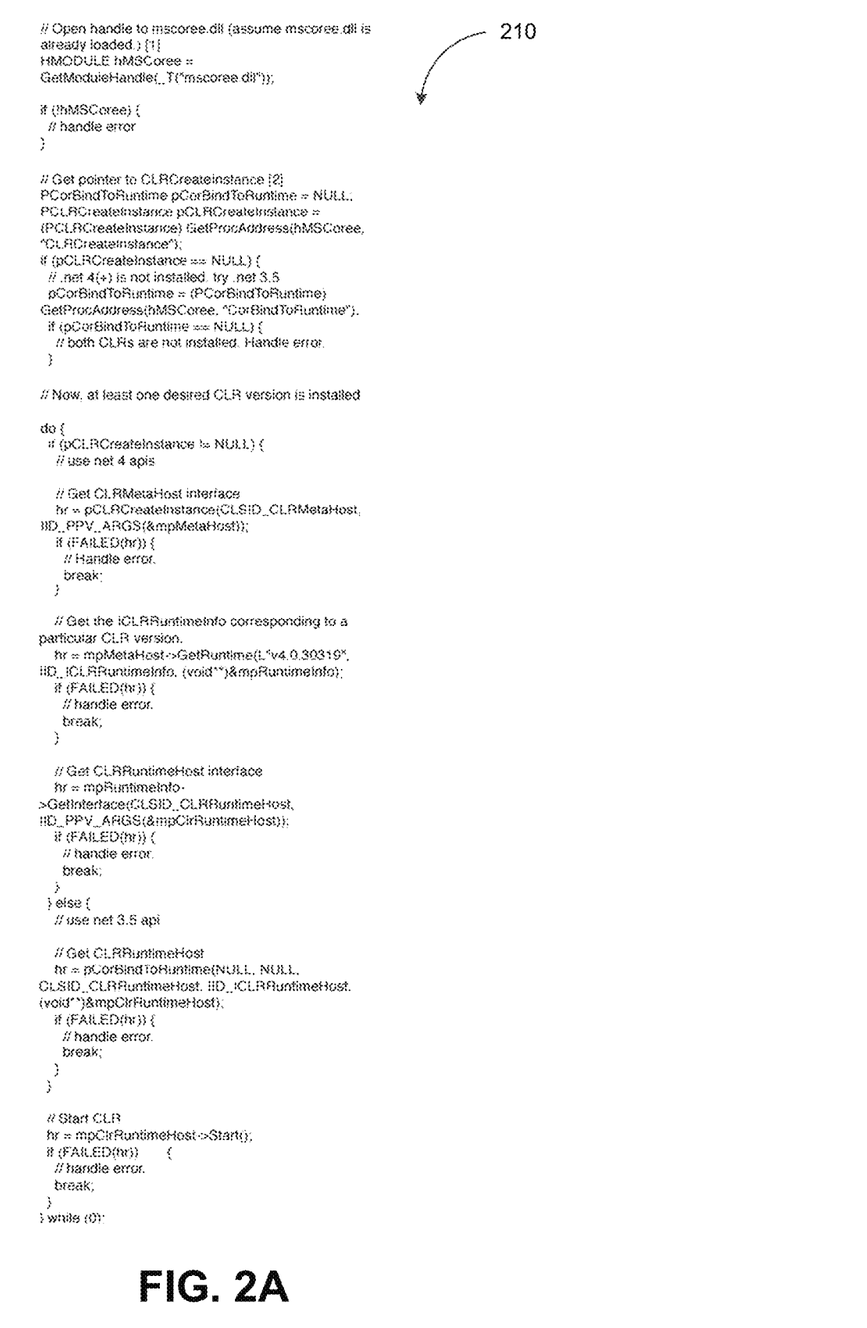
FIG. 2A depicts code implementing a native service controller consistent with implementations of the current subject matter.

FIG. 2A depicts code 210 implementing the native service controller 100 consistent with implementations of the current subject matter. The code 210 shown in FIG. 2A can be included in the loader manager 110 to load the CLR environment for one or more of the .NET applications.

Figure 2B:
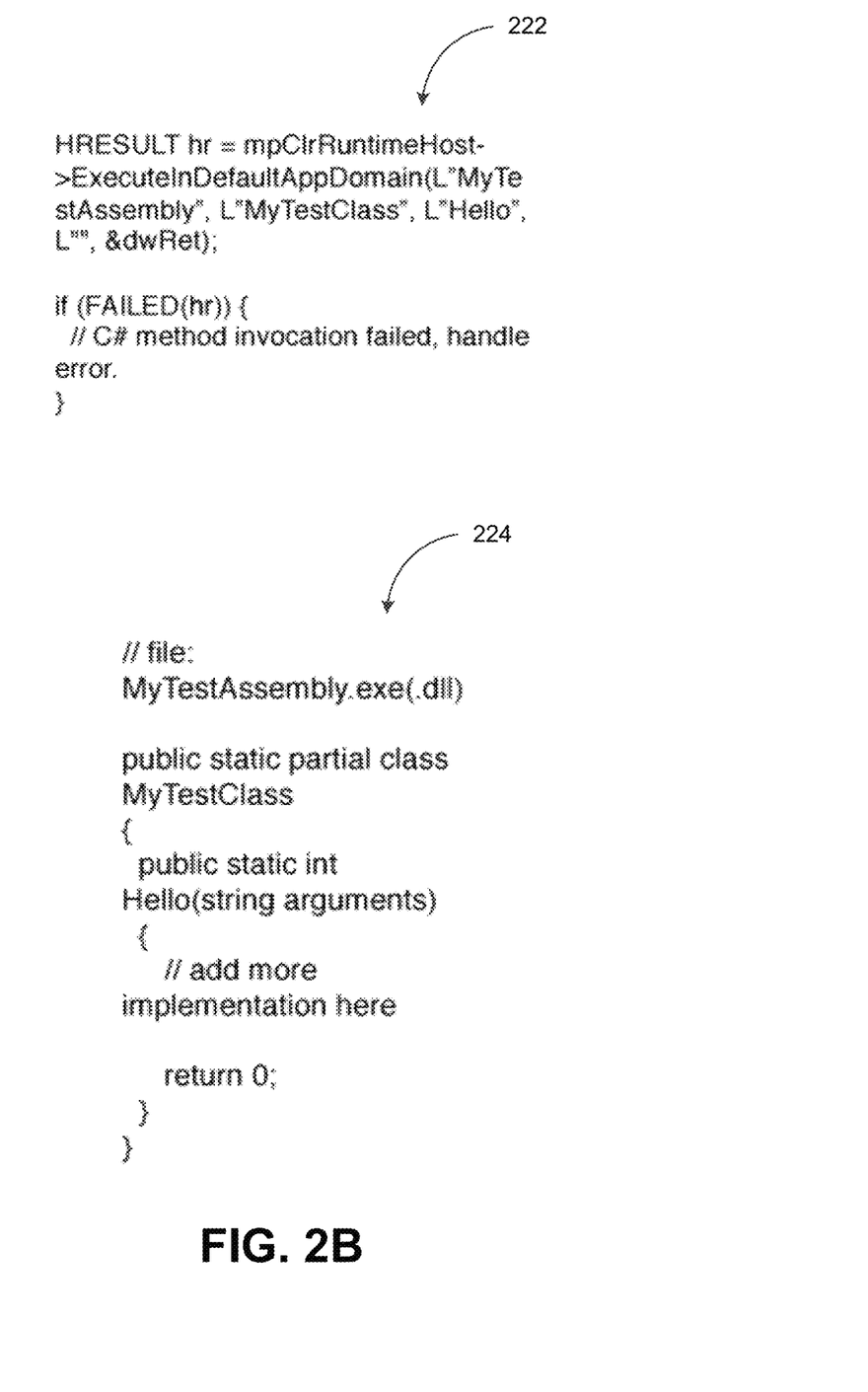
FIG. 2B depicts code implementing a native service controller consistent with implementations of the current subject matter.

FIG. 2B depicts code 222 and code 224 for implementing the native service controller 100 consistent with implementations of the current subject matter. Referring to FIGS. 1 and 2A-B, the code 222 shown in FIG. 2B can be included in the loader manager 110 to load one or more non-native code applications and/or dynamic libraries including, for example, the first non-native code 122 and the second non-native code 124. Meanwhile, the code 224 can implement a non-native code application and/or dynamic-link library including, for example, the first non-native code 122 and the second non-native code 124.

Figure 2C:
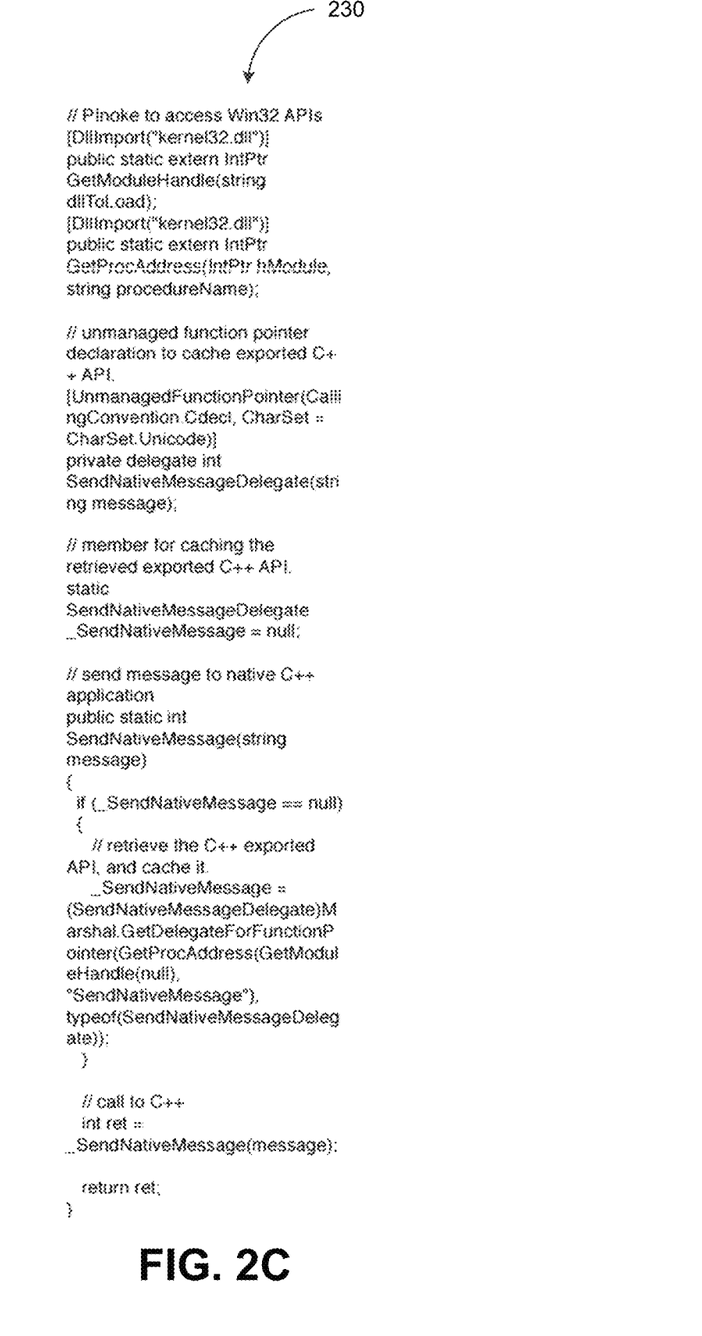
FIG. 2C depicts code implementing a native service controller consistent with implementations of the current subject matter.

FIG. 2C depicts code 230 implementing the native service controller 100 consistent with implementations of the current subject matter. Referring to FIGS. 1 and 2A-C, the code 230 shown in FIG. 2C can implement the exchange of data (e.g., via messages) by a non-native code application (e.g., the first non-native code 122, the second non-native code 124) with other native and/or non-native code applications loaded by the native service controller 100.

Figure 3:
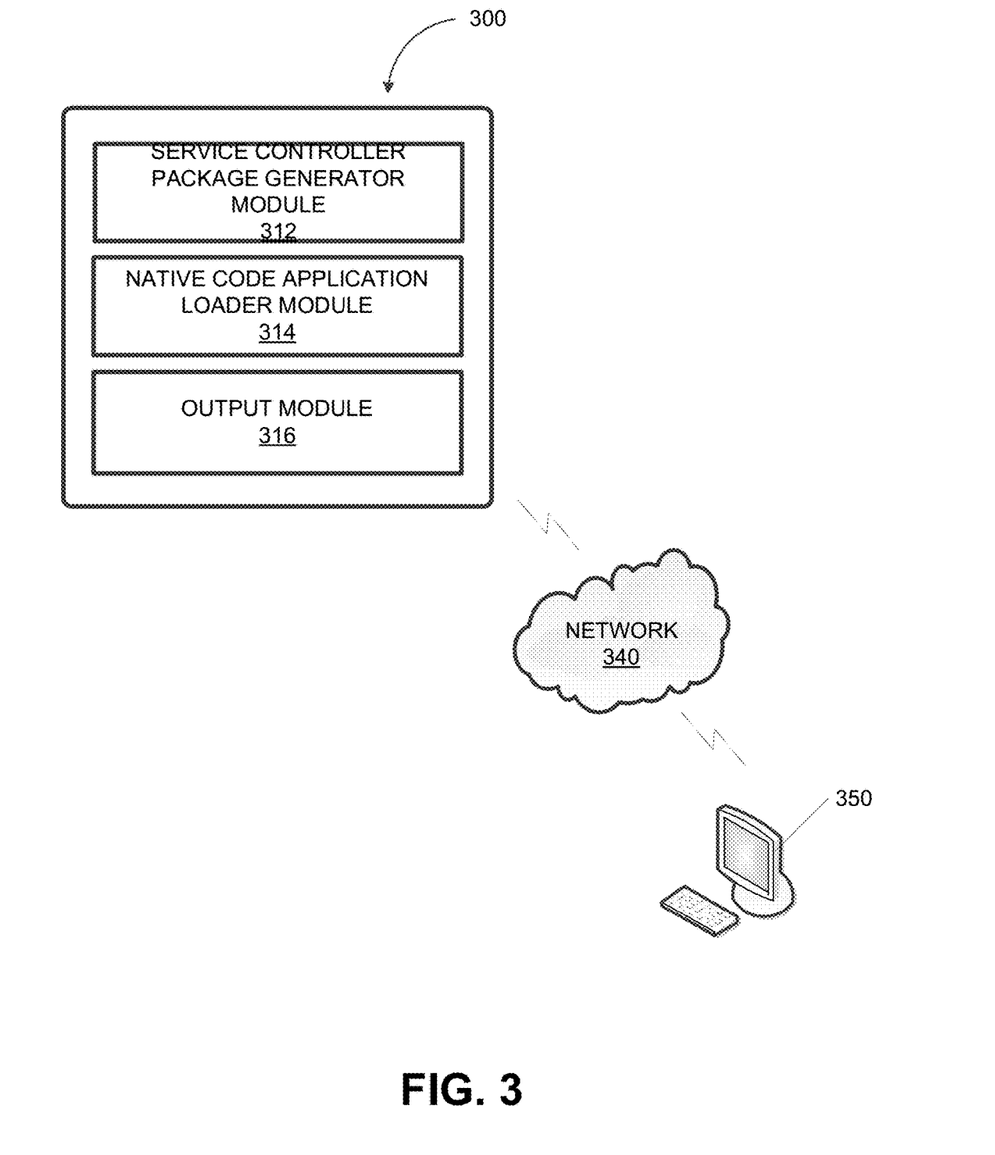
FIG. 3 depicts a block diagram illustrating a system consistent with implementations of the current subject matter.

FIG. 3 depicts a block diagram illustrating a system 300 consistent with implementations of the current subject matter. Referring to FIGS. 1-3, the system 300 can include a service controller package generator module 312, a native code application loader module 314, and an output module 316. In implementations of the current subject matter, the system 300 can be configured to generate and/or load the native service controller 100.

In some implementations of the current subject matter, the service controller package generator module 312 can be configured to generate the distribution package 150 by generating an executable wrapper written in a native code programming language. The service controller package generator module 312 can be further configured to encapsulate, within the native code wrapper, a native service controller along with a loader manager and/or a plurality of native code dynamic libraries and/or non-native code applications and/or dynamic libraries. The loader manager can be written in a native code programming language (e.g., C, C++). For example, referring to FIG. 1, the service controller package generator 312 can be configured to generate the distribution package 150 by encapsulating, in a native code executable, the native service controller 100, the loader manager 110, the first non-native code 122, and the second native code dynamic-link library 134. The native service controller 100 can be loaded automatically by an operating system (e.g., at startup or after).

The native code application loader module 314 can be configured to load one or more applications written in native code including, for example, the native service controller 100, which can be include in the distributed package 150. For example, the native code application loader module 314 can be configured to load the native service controller 100. According to some implementations of the current subject matter, the native code application loader module 314 can load the native service controller 100 as one process while the native service controller 100 further loads, in the same process, a plurality of native code dynamic libraries and/or non-native code applications and/or dynamic libraries (e.g., the first non-native code 122, the second non-native code 124, the first native code dynamic-link library 132, the second native code dynamic-link library 134). Because the native service controller 100 loads the plurality of native code and/or non-native code applications in a single process and in the same virtual memory space, the applications can share data via the shared virtual memory instead of exchanging data using one or more IPC mechanisms (e.g., sockets, pipes, message queues).

According to some implementations of the current subject matter, loading the native service controller 100 can generate plurality of threads including, for example, a main thread and one or more worker threads. The scheduler of the operating system can schedule the threads to run without prioritizing any one thread (e.g., main thread over the worker threads and/or vice versa). One of the plurality of threads (e.g., the main thread or one of the worker threads) is responsible for reporting the running status of the native service controller 100 to the operating system scheduler. In order to ensure that the thread is able to report the running status of the native service controller 100 to the scheduler, the other threads can be configured to yield (e.g., the CPU) whenever the other threads are scheduled (e.g., by the scheduler) to run. For instance, the threads not responsible for reporting the running status can be configured to transmit a SLEEP message to the operating system scheduler, thereby causing the operating system scheduler to start running a next thread in the scheduler's queue. Yielding to the thread responsible for reporting the running status enables that thread to run and to report the running status of the native service controller 100 before the loading of the native service controller 100 times out (e.g., within 30 seconds).

In some implementations of the current subject matter, the native service controller 100 can be deployed (e.g., downloaded and/or installed) on one or more devices including, for example, a device 350. For instance, the native service controller 100 can be deployed to run on the device 350, thereby allowing the first non-native code 122, the second non-native code 124, the first native code dynamic link library 132, and the second native code dynamic link library 134 to be loaded as part of the same process. The native service controller 100 can be provided in any manner including, for example, as computer software, dedicated circuitry (e.g., application specific integrated circuits (ASICs)), and/or over a cloud platform. For example, as shown in FIG. 3, the device 350 can download the native service controller 100 via a wired and/or wireless network 340 (e.g., a local area network (LAN), a wide area network (WAN), and/or the Internet).

Figure 4:
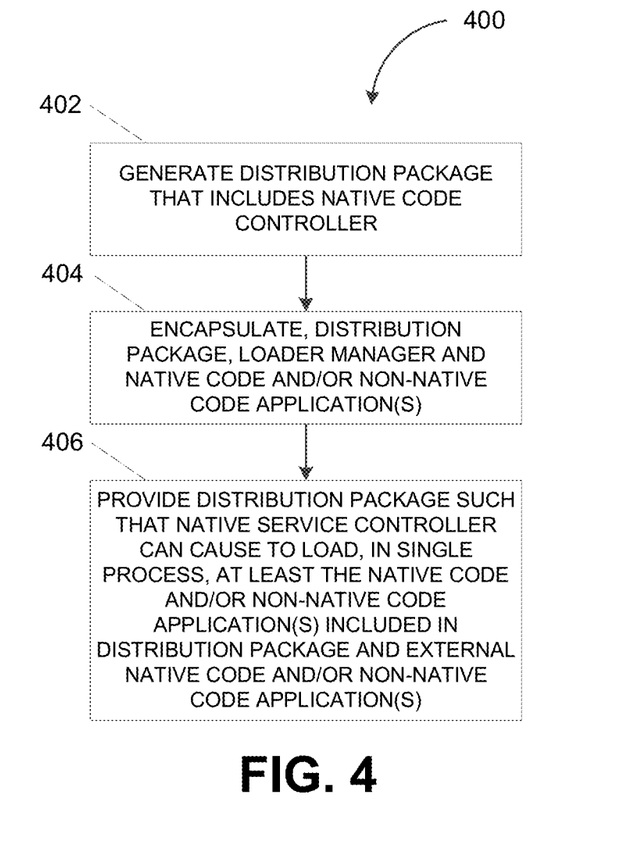
FIG. 4 depicts a flowchart illustrating a process for generating a native service controller consistent with implementations of the current subject matter.

FIG. 4 depicts a flowchart illustrating a process 400 for generating the native service controller 100 consistent with implementations of the current subject matter. Referring to FIGS. 1-4, the process 400 can be performed by the system 300. In some implementations of the current subject matter, the process 400 can be performed by the system 300 to generate one or more native service controllers including, for example, the native service controller 100.

The system 300 can generate a distribution package that includes a native service controller (402). For instance, the system 300 can generate the distribution package 150. The system 300 can further include, in the distribution package 150, the native service controller 100. In some implementations of the current subject matter, the native service controller 110 is an executable written in native code and can therefore be loaded automatically by an operating system (e.g., at startup time or after).

The system 300 can encapsulate, in the distribution package, a loader manager and a plurality of native code and/or non-native code applications (404). For example, the system 300 can further include, in the distribution package 150, the loader manager 110, the first non-native code 122, and the second native code dynamic link library 134.

The system 300 can provide the distribution package such that the native service controller can cause to load, in a single process, the plurality of native code and/or non-native code applications included in the distribution package and one or more external native code and/or non-native code applications (406). For example, the distribution package 150 can be provided as computer software, dedicated circuitry (e.g., ASICs), and/or over a cloud platform. Loading the native service controller 100 can cause the loader manager 110 to execute. The loader manager 110 can be configured to load the appropriate non-native runtime environment for the first non-native code application 122, which is included with the distribution package 150. The loader manager 110 can be further configured to load the appropriate non-native runtime environment for the second non-native code application 124, which is external to the distribution package 150.

In addition, the loader manager 110 can be configured to load the first non-native code 122, the second non-native code 124, the first native code dynamic link library 132, and the second native code dynamic link library 134. Applications and/or dynamic link libraries loaded in this manner are part of a single process sharing the same virtual memory space. As such, the first non-native code 122, the second non-native code 124, the first native code dynamic link library, and the second native code dynamic link library 134 can share data without using any IPC mechanisms (e.g., sockets, pipes, and/or message queues).

Figure 5:
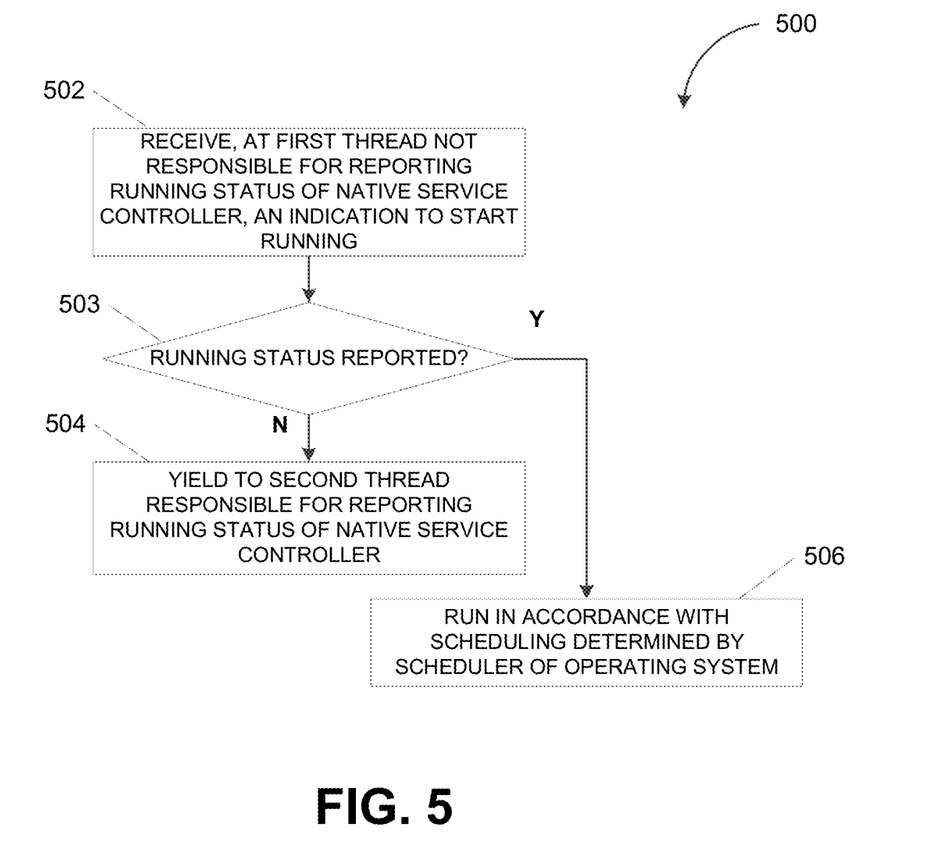
FIG. 5 depicts a flowchart illustrating a process for loading a native service controller consistent with implementations of the current subject matter.

FIG. 5 depicts a flowchart illustrating a process 500 for loading a native service controller consistent with implementations of the current subject matter. Referring to FIGS. 1-3 and 5, the process 500 can be performed by a thread (e.g., main thread, worker thread) that is generated during the loading of the native service controller 100. For example, loading the native service controller 100 can generate a main thread and a plurality of worker threads. The main threads and the plurality of worker threads can be run in an order determined by a scheduler of an operating system. Furthermore, the main thread or one of the plurality of worker threads can be tasked with reporting the running status of the native service controller 100.

A first thread that is not responsible for reporting the running status of the native service controller 100 can receive an indication to start running (502). For example, the scheduler of the operating system can schedule a main thread or a worker thread to run. However, the scheduler of the operating system does not prioritize an order in which the threads run based on which thread is responsible for reporting the running status of the native service controller 100. For instance, the main thread can be tasked with reporting the running status of the native service controller 100. But the scheduler can schedule one or more worker threads to run ahead of the main thread, thereby preventing the main thread from reporting a running status of the native service controller 100 on a timely basis (e.g., before the loading of the native service controller 100 is timed out).

As such, the first thread can determine whether the running status of the native service controller 100 has been reported (503). If the first thread determines that the running status of the native service controller 100 has not already been reported (503—N), the first thread can yield to a second thread that is responsible for reporting the running status of the native service controller 100 (504). For example, the worker thread can yield to the main thread by transmitting a SLEEP message to the scheduler, thereby forfeiting its opportunity to use the CPU and allowing the next scheduled thread to use the CPU instead. By yielding to the main thread, the worker thread can allow the main thread to run ahead of the worker thread. In this manner, the main thread can have an opportunity to report the running status of the native service controller 100 to the scheduler before the loading of the native service controller 100 times out.

Alternately, if the first thread determines that the running status of the native service controller 100 has been reported (503-Y), the first thread can run in accordance with the scheduling determined by the scheduler of the operating system (506). For example, once the main thread reports the running status of the native service controller 100, the worker thread can run as scheduled by the scheduler of the operating system.

Implementations of the present disclosure can include, but are not limited to, methods consistent with the descriptions provided above as well as articles that comprise a tangibly embodied machine-readable medium operable to cause one or more machines (e.g., computers, etc.) to result in operations implementing one or more of the described features. Similarly, computer systems are also described that can include one or more processors and one or more memories coupled to the one or more processors. A memory, which can include a computer-readable storage medium, can include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital MRI image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations can be within the scope of the following claim.

What is claimed is:

1. A system, comprising:
    at least one processor; and
    at least one memory including program code which when executed by the at least one processor provides operations comprising:
        generating a single process, the generating comprising running a native code executable, the running of the native code executable comprises loading a loader manager as part of the single process;
        loading, by the loader manager running within the single process, a runtime environment corresponding to a non-native code application; and
        loading, by the loader manager, the non-native code application, the non-native code application being loaded to run as part of the single process.

2. The system of claim 1, wherein the operations further comprise:
    exchanging data between the non-native code application and another application loaded by the loader manager to run as part of the single process, the exchanging of data between the non-native code application and the other application being performed without using one or more inter process communication (IPC) mechanisms.

3. The system of claim 1, wherein the loader manager is written in a native code programming language.

4. The system of claim 1, wherein the operations further comprise:
    loading, by the loader manager, another application, the other application being loaded to run as part of the single process.

5. The system of claim 4, wherein the other application comprises another non-native code application, and wherein the loader manager further loads a runtime environment corresponding to the other non-native code application.

6. The system of claim 4, wherein the other application comprises a native code application.

7. The system of claim 1, wherein the runtime environment corresponding to the non-native code application comprises a Common Language Runtime (CLR) environment, a Mono Runtime environment, a Ruby runtime environment, or a Python runtime environment.

8. The system of claim 1, wherein the non-native code application comprises an application that requires the loading of the corresponding runtime environment prior to execution.

9. The system of claim 1, wherein the operations further comprise:
    loading, by the loader manager, a native code dynamic link library as part of the single process.

10. The system of claim 9, wherein the non-native code application and the native code dynamic link library are configured to provide services adapted to operate in a background of a running operating system.

11. The system of claim 1, wherein the running of the native code executable generates at least a first thread and a second thread.

12. The system of claim 11, wherein the first thread is configured report a running status of the native code executable to a scheduler of an operating system, and wherein the second thread is configured to yield to the first thread by at least:
   determining, when the second thread is scheduled to run by the scheduler, whether the running status of the native code executable has been reported to the scheduler;
   in response to determining that the running status of the native code executable has not been reported to the scheduler, yielding to the first thread by at least transmitting, to the scheduler, a message that causes the scheduler to start running the first thread or a third thread.

13. The system of claim 12, wherein the yielding by the second thread allows the first thread to run ahead of the second thread and to report the running status to the scheduler before a loading of the native code executable is timed out.

14. A method, comprising:
   generating, by at least one processor, a single process, the generating comprising running a native code executable, the running of the native code executable comprises loading a loader manager as part of the single process;
   loading, by the loader manager running within the single process, a runtime environment corresponding to a non-native code application; and
   loading, by the loader manager, the non-native code application, the non-native code application being loaded to run as part of the single process.

15. The method of claim 14, further comprising:
   loading, by the loader manager, another application, the other application being loaded to run as part of the single process.

16. The method of claim 15, further comprising:
   exchanging data between the non-native code application and the other application, the exchanging of data between the non-native code application and the other application being performed without using one or more inter process communication (IPC) mechanisms.

17. The method of claim 15, wherein the other application comprises another non-native code application, and wherein the loader manager further loads a runtime environment corresponding to the other non-native code application.

18. The method of claim 15, wherein the other application comprises a native code application.

19. The method of claim 14, further comprising:
   loading, by the loader manager, a native code dynamic link library as part of the single process, wherein the non-native code application and the native code dynamic link library are configured to provide services adapted to operate in a background of a running operating system.

20. The method of claim 14, wherein the running of the native code executable generates at least a first thread and a second thread.

21. The method of claim 20, wherein the first thread is configured report a running status of the native code executable to a scheduler of an operating system, and wherein the second thread is configured to yield to the first thread by at least:
   determining, when the second thread is scheduled to run by the scheduler, whether the running status of the native code executable has been reported to the scheduler;
   in response to determining that the running status of the native code executable has not been reported to the scheduler, yielding to the first thread by at least transmitting, to the scheduler, a message that causes the scheduler to start running the first thread or a third thread.

22. The method of claim 21, wherein the yielding by the second thread allows the first thread to run ahead of the second thread and to report the running status to the scheduler before a loading of the native code executable is timed out.

23. The method of claim 14, wherein the runtime environment corresponding to the non-native code application comprises a Common Language Runtime (CLR) environment, a Mono Runtime environment, a Ruby runtime environment, or a Python runtime environment.

24. The method of claim 14, wherein the non-native code application comprises an application that requires the loading of the corresponding runtime environment prior to execution.

25. A computer program product comprising a non-transitory machine-readable medium storing instructions that, when executed by at least one programmable processor, cause the at least one programmable processor to perform operations comprising:
   generating a single process, the generating comprising running a native code executable, the running of the native code executable comprises loading a loader manager as part of the single process;
   loading, by the loader manager running within the single process, a runtime environment corresponding to a non-native code application; and
   loading, by the loader manager, the non-native code application, the non-native code application being loaded to run as part of the single process.

* * * * *